(12) United States Patent
Ikeda et al.

(10) Patent No.: US 8,581,938 B2
(45) Date of Patent: Nov. 12, 2013

(54) INFORMATION PROCESSING APPARATUS, INFORMATION PROCESSING METHOD AND PROGRAM FOR MAGNIFYING A SCREEN AND MOVING A DISPLAYED CONTENT

(75) Inventors: Tetsuo Ikeda, Tokyo (JP); Ryu Aoyama, Kanagawa (JP); Hiroshi Ueno, Tokyo (JP)

(73) Assignee: Sony Corporation, Tokyo (JP)

( * ) Notice: Subject to any disclaimer, the term of this patent is extended or adjusted under 35 U.S.C. 154(b) by 1083 days.

(21) Appl. No.: 12/567,471

(22) Filed: Sep. 25, 2009

(65) Prior Publication Data
US 2010/0079501 A1 Apr. 1, 2010

(30) Foreign Application Priority Data

Sep. 30, 2008 (JP) ................................ P2008-253818

(51) Int. Cl.
G09G 5/00 (2006.01)
G06F 3/033 (2013.01)

(52) U.S. Cl.
USPC ............ 345/660; 345/619; 345/173; 715/863

(58) Field of Classification Search
USPC ................... 345/672, 660, 619, 173; 715/863
See application file for complete search history.

(56) References Cited

U.S. PATENT DOCUMENTS

| | | | | |
|---|---|---|---|---|
| 6,121,960 A * | 9/2000 | Carroll et al. | ................. | 345/173 |
| 6,958,749 B1 * | 10/2005 | Matsushita et al. | ........... | 345/175 |
| 2002/0036618 A1 | 3/2002 | Wakai et al. | | |
| 2006/0025218 A1 | 2/2006 | Hotta | | |
| 2007/0226646 A1 * | 9/2007 | Nagiyama et al. | ............ | 715/784 |
| 2008/0094370 A1 * | 4/2008 | Ording et al. | ................. | 345/173 |

FOREIGN PATENT DOCUMENTS

| | | |
|---|---|---|
| EP | 1 942 401 | 7/2008 |
| JP | 8-76926 | 3/1996 |
| JP | 11-102274 | 4/1999 |
| JP | 2005-234291 | 9/2005 |
| JP | 2006-145930 | 6/2006 |
| JP | 2006-162267 | 6/2006 |
| JP | 2007-256338 | 10/2007 |
| JP | 2008-084158 | 4/2008 |
| WO | WO 98/09270 | 3/1998 |

OTHER PUBLICATIONS

Malik et al., Interacting With Large Displays From a Distance With Vision-Tracked Multi-Finger Gestural Input, Department of Computer Science, University of Toronto, Canada, Oct. 2005.
Malik et al., Visual Touchpad: A Two-Handed Gestural Input Device, Department of Computer Science, University of Toronto, Canada, Oct. 13-15, 2004.
Jan. 7, 2013, EPO Communication for related application No. EP 09 25 1967.

* cited by examiner

Primary Examiner — Michelle L Sams
(74) Attorney, Agent, or Firm — Sherr & Jiang, PLLC

(57) ABSTRACT

An information processing apparatus according to the present invention includes: an input position detecting unit for detecting a position of an operator positioned on an operation input unit; a direction detecting unit for detecting a moving direction of the operator based on time change of the position of the detected operator; a magnification change unit for changing a magnification of a screen in accordance with a number of the operator detected by the input position detecting unit; and a display content moving unit for moving a content displayed on the screen along the moving direction of the operator detected by the direction detecting unit.

14 Claims, 10 Drawing Sheets

INFORMATION PROCESSING APPARATUS, INFORMATION PROCESSING METHOD AND PROGRAM FOR MAGNIFYING A SCREEN AND MOVING A DISPLAYED CONTENT

BACKGROUND OF THE INVENTION

1. Field of the Invention

The present invention relates to an information processing apparatus, an information processing method and a program.

2. Description of the Related Art

In recent years, portable information processing apparatuses each equipped with a touch panel or touch pad (hereinafter referred to as "touch panel") have been widely used. Such portable information processing apparatuses include, for example, a portable phone, a PHS (Personal Handy-phone System), a portable movie player, a portable music player, a PDA (Personal Digital Assistant) and the like. Further recently, a television receiver, a portable game player and a remote controller are also equipped with touch panels. Out of these information processing apparatuses, some are not equipped with operating means other than touch panels. A user of such an information processing apparatus performs almost all operations with use of a touch panel.

For example, Japanese Patent Application Laid-Open No. 8-76926 discloses a method of switching screen displays based on the moving direction of the finger that is in touch with the screen. With use of such a method, the user may use the information processing apparatus by intuitive operations.

An example of applications executed by such an information processing apparatus equipped with a touch panel is a map application for displaying a map of a desired place. When the method of JP-A No. 8-76926 is applied to this map application, the user can scroll the map displayed on the screen by moving the finger, stylus or the like (hereinafter referred to as "operator").

In addition, Japanese Patent Application Laid-Open No. 2007-256338 discloses a method of scrolling the screen by changing the map in scale in accordance with a distance between the screen center and the position touched by the operator.

SUMMARY OF THE INVENTION

However, in widely scrolling the map which is displayed by the map application using the above-mentioned method of JP-A No. 8-76926, drag operations have to be repeated many times or performed after changing in scale, which may cause an issue of loss of operability.

Further, when the method of the above-mentioned JP-A No. 2007-256338 is used to scroll the screen widely, the screen display may be changed at a dizzying pace, which may cause issues that the current position may be easily lost and fine adjustments of the scroll width is difficult.

Then, the present invention has been made in view of the above issues and it is desirable to provide new and improved information processing apparatus, information processing method and program capable of easy scrolling of the screen and easy fine adjustments of scroll width.

According to an embodiment of the present invention, there is provided an information processing apparatus including: an input position detecting unit for detecting a position of an operator positioned on an operation input unit; a direction detecting unit for detecting a moving direction of the operator based on time change of the position of the operator detected; a magnification change unit for changing a magnification of a screen in accordance with a number of the operator detected by the input position detecting unit; and a display content moving unit for moving a content displayed on the screen along the moving direction of the operator detected by the direction detecting unit.

According to this configuration, the input position detecting unit detects a position of the operator positioned on the operation input unit. Besides, the direction detecting unit detects the moving direction of the operator based on time change of the detected operator's position. The magnification change unit changes the magnification of the screen based on the number of operators detected by the input position detecting unit. The display content moving unit moves the content displayed on the screen along the moving direction of the operator detected by the direction detecting unit.

The input position detecting unit may output a coordinate pair of the operator positioned on the operation input unit, and the magnification change unit may change the magnification in accordance with a number of the coordinate pair of the operator simultaneously sent from the input position detecting unit.

The magnification change unit may reduce the magnification as the number of the operator increases, and increase the magnification as the number of the operator decreases.

When a plurality of operators exists, the direction detecting unit may select, as the moving direction, a direction corresponding to a sum of vectors defined by trails drawn by the respective operators.

When the coordinate pair of the operator sent from the input position detecting unit is changed by a predetermined threshold value or more, the direction detecting unit may determine that operator has moved.

The display content moving unit may move the content displayed on the screen at a fixed speed in accordance with the moving distance of the operator, irrespective of the magnification.

According to another embodiment of the present invention, there is provided an information processing method including the steps of: detecting a position of an operator positioned on an operation input unit; detecting a moving direction of the operator based on time change of the position of the detected operator; changing a magnification of a screen in accordance with a number of the detected operator; and moving a content displayed on the screen along the moving direction of the detected operator.

According to another embodiment of the present invention, there is provided a program causing a computer having an operation input unit to execute: an input position detecting function of detecting a position of an operator positioned on the operation input unit; a direction detecting function of detecting a moving direction of the operator based on time change of the position of the detected operator; a magnification change function of changing a magnification of a screen in accordance with a number of the detected operator; and a display content moving function of moving a content displayed on the screen along the moving direction of the detected operator.

According to this configuration, as the computer program is stored in the storage unit of the computer and read by the CPU of the computer to be executed, the computer can act as the above-described information processing apparatus. In addition, a recording medium storing the computer program and readable by the computer may be provided. The recording medium may be, for example, a magnetic disk, optical disc, magnetic optical disk, flash memory, or the like. The above-mentioned computer program may be distributed via network or the like without use of any recording medium.

According to the embodiments of the present invention described above, the screen can be scrolled with easy operation and fine adjustments of the scroll width can be facilitated.

DETAILED DESCRIPTION OF THE PREFERRED EMBODIMENTS

Hereinafter, preferred embodiments of the present invention will be described in detail with reference to the appended drawings. Note that, in this specification and the appended drawings, structural elements that have substantially the same function and configuration are denoted with the same reference numerals, and repeated explanation of these structural elements is omitted.

Here, description is made in the following order.
(1) Purpose
(2) First embodiment
(2-1) overall configuration of an information processing apparatus
(2-2) Functional configuration of the information processing apparatus
(2-3) Information processing method
(2-4) Application example to map application
(3) Hardware configuration of the information processing apparatus according to the embodiments of the present invention
(4) Conclusion
<Purpose>

Figure 9:
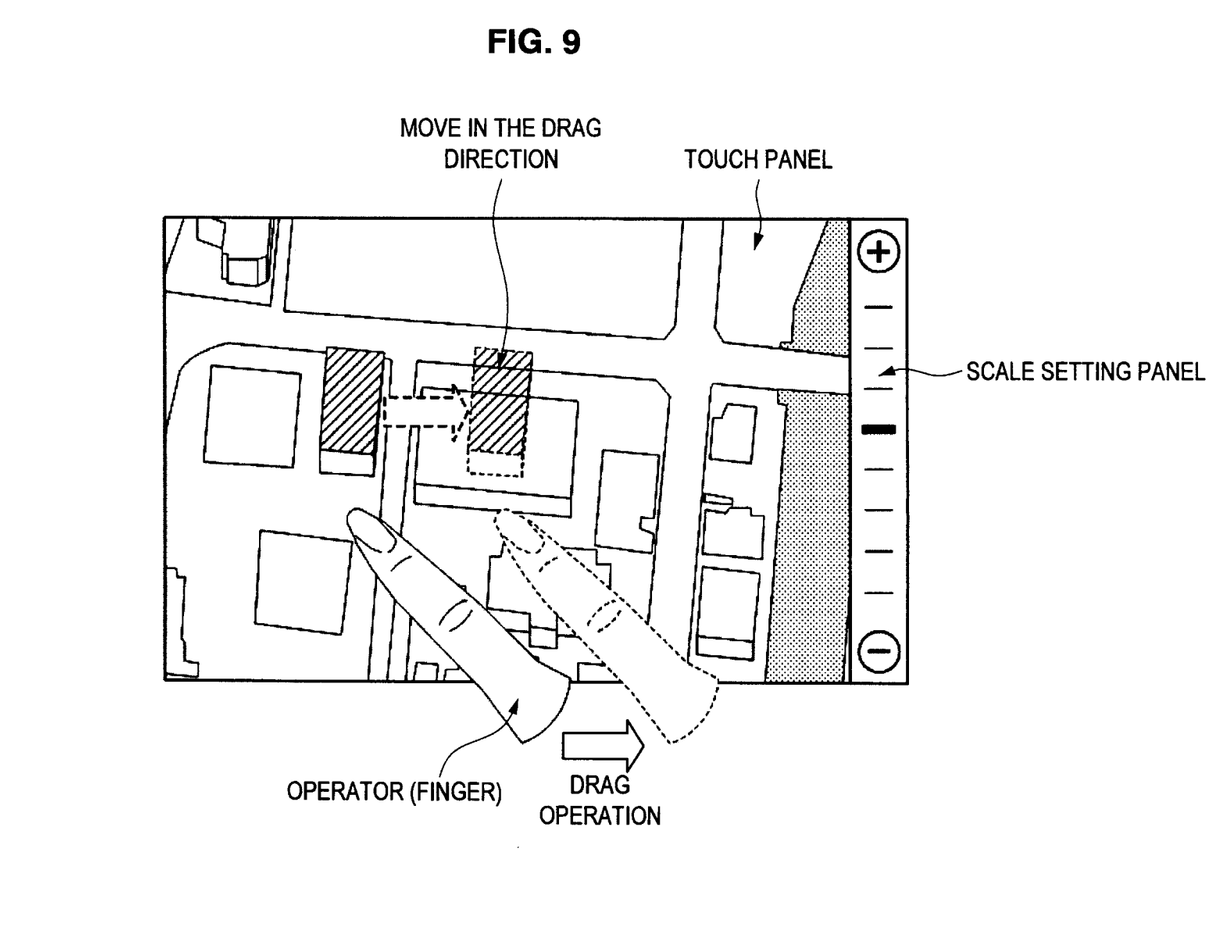
FIG. 9 is an explanatory view for explaining an information processing method in a related-art application.
Figure 10:
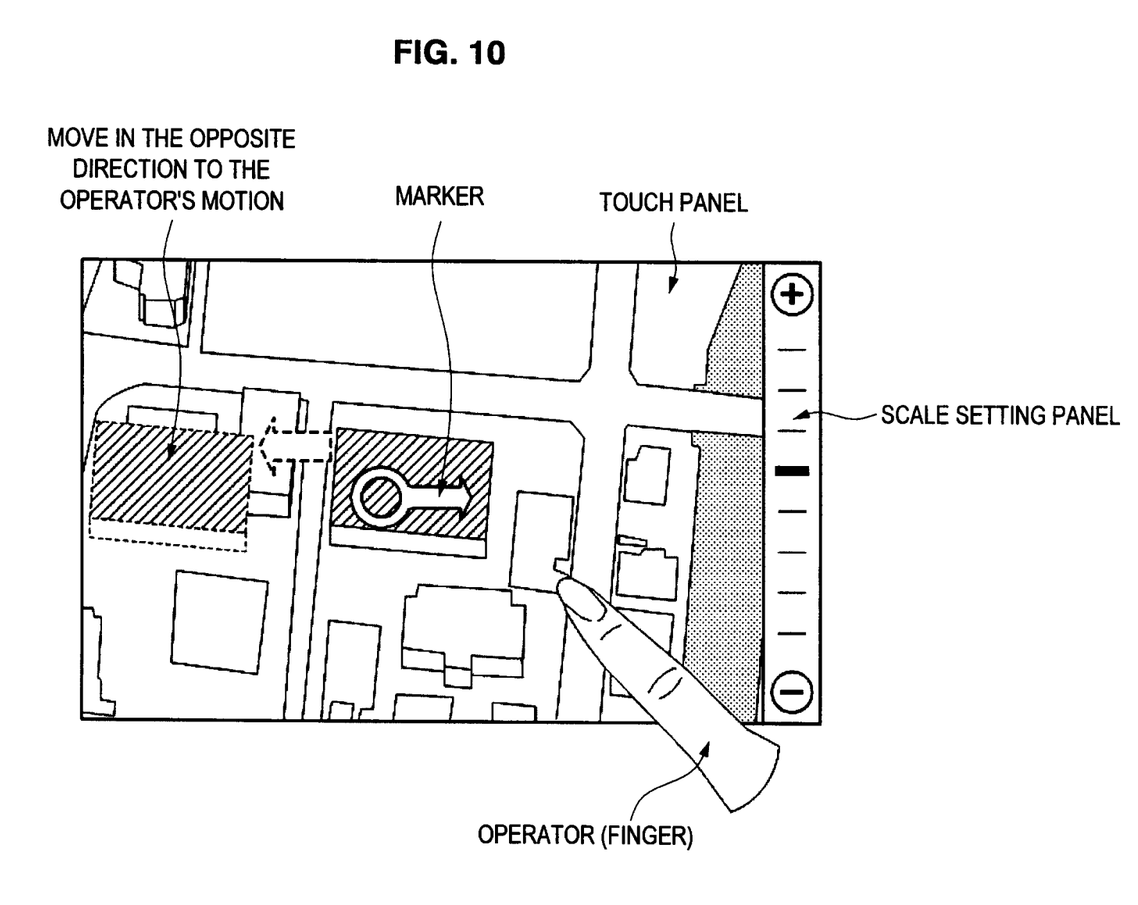
FIG. 10 is an explanatory view for explaining an information processing method in a related-art application.

Before description of the embodiments of the present invention, a typical information processing method will be described briefly with reference to FIGS. 9 and 10. FIGS. 9 and 10 are explanatory views each for explaining an information processing method in a related-art application. The following explanation of FIGS. 9 and 10 is made with an example of map application for displaying a map on a screen as one example of the related-art application.

First description is made with reference to FIG. 9. In FIG. 9, a map display area for displaying a map of a certain area and a scale setting area for selecting a scale of the displayed map are shown on the screen equipped with a touch panel. In order to display the map of the certain area, a user first operates the scale setting area to select a rough place in the area the user desires to display and set the scale smaller so that more detailed map can be displayed. Then, the user uses an operator such as a finger to scroll the displayed map so as to make the desired area displayed properly.

In the map application shown in FIG. 9, the map is scrolled following the drag operation of the finger as operator. More specifically, in FIG. 9, a diagonally shaded building is scrolled to the right according to the drag operation to the right as shown in the figure. The user can utilize this application through an intuitive operation. However, when the user wishes to scroll the displayed map widely, the user has to repeat the drag operation by the operator many times or change the scale on the scale setting area before the drag operation. For this reason, in the application using such an operation method, if the information processing operation is performed of scrolling the displayed content widely, there is an issue of lack of user operability.

Then, description is made with reference to FIG. 10, which shows a map display area for displaying the map of a particular area on the display screen equipped with a touch panel and a scale setting area for selecting the scale of displayed map. In the map display area, a marker is displayed indicating the current position. In such a map application, the scroll width of the displayed map is determined in accordance with how far from the marker the arrow starting from the marker is. That is, in operation of the marker with the operator such as a finger, the map is scrolled small when the arrow is close to the marker and the map is scrolled large when the arrow is far away from the marker. Such scrolling processing needs adjustment of scroll width. However, as the screen displays are changed dizzyingly through large scrolling in such scroll processing, there is caused an issue of easy losing of the current position and difficulty in fine adjustments of the scroll width.

In addition, as the marker is moved in such scroll processing, the map is scrolled in the opposite direction to the scrolling direction of the touch panel by the operator. Specifically, in FIG. 10, when the operator is used to scroll to the right, the diagonally shaded building positioned in the center of the screen moves to the left. In this way, the processing is performed in the opposite direction to the user's intuitive operation, there is caused an issue of the need for the user to learn the operation method prior to actual use of the application.

In order to solve the above-mentioned issues and to provide a method for scrolling a displayed content by easy operation and facilitating fine adjustments of the scroll width, the inventors of the present application have found the technique described below.
(First Embodiment)
<Overall Configuration of Information Processing Apparatus>

Figure 1:
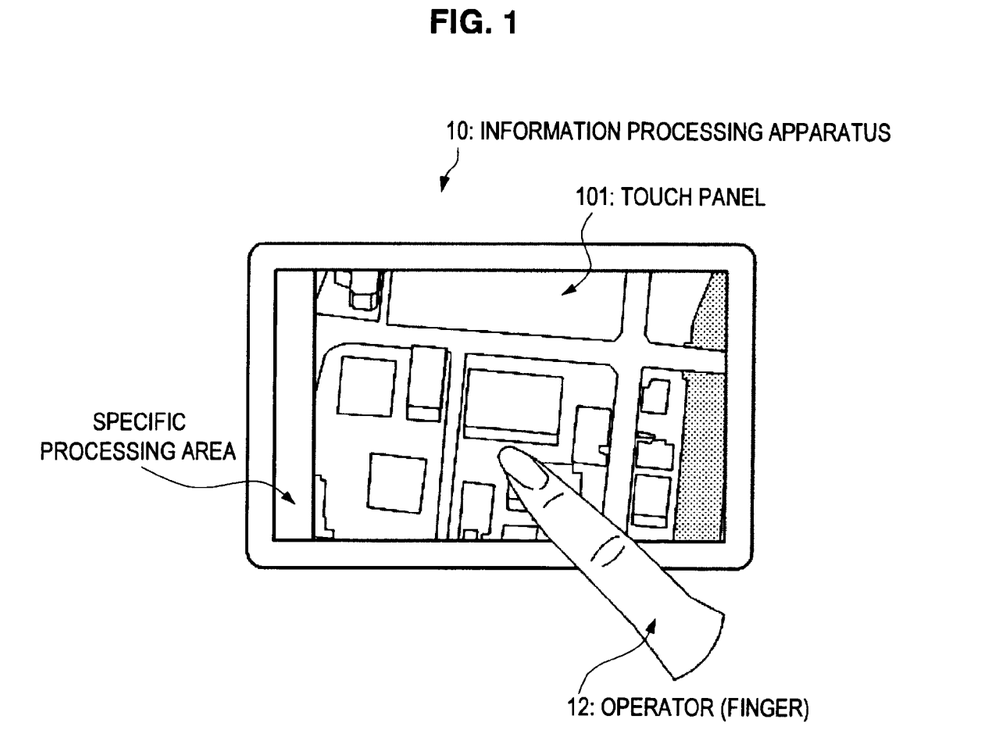
FIG. 1 is an explanatory view for explaining a visual example of an information processing apparatus according to a first embodiment of the present invention.

First, description is made, with reference to FIG. 1, about the overall configuration of the information processing apparatus according to the first embodiment of the present invention. FIG. 1 is an explanatory view for visually explaining the information processing apparatus 10 according to the present embodiment. The following description is made taking an example of executing a map application for displaying a map on the screen of a display unit of the information processing apparatus 10.

As illustrated in FIG. 1, the information processing apparatus 10 is provided with a display unit having a touch panel 101 (hereinafter referred to as "touch panel 101"). As shown in FIG. 1, various kinds of information are displayed on the touch panel 101. The various kinds of information such as maps displayed on the touch panel 101 are subjected to predetermined processing such as scrolling in accordance with touch and movement of the operator 12. Besides, the touch panel 101 may be provided with a specific processing area, in which, for example, an object such as an icon is displayed for execution of the predetermined processing and when this specific processing area is selected, the predetermined processing associated with the displayed object is executed.

The information processing apparatus 10 does not perform only the specified processing such as object selection and movement of the displayed content in response to touch or movement of the operator 12. For example, when the operator 12 moves drawing a predetermined trail while it is in touch with the touch panel 101, the information processing apparatus 10 executes the predetermined processing corresponding to the trail drawn by the operator 12. In other words, the information processing apparatus 10 has a gesture input function. For example, when a predetermined gesture is input, an application associated with the gesture is launched or the predetermined processing associated with the gesture is executed.

The operator 12 is, for example, a user's finger or the like. Besides, the operator 12 may be sometimes a stylus, touch pen, or the like. When the touch panel 101 is an optical one, any object may be the operator 12. For example, when the touch panel 101 is an optical one, any soft tool such as brush, which is hard to press the touch panel 101, may be used as the operator 12. Further, when the touch panel 101 is an In-Cell type optical touch panel, any object may be the operator 12 as long as its shade is shown on the touch panel 101.

Here, the In-Cell type optical touch panel is explained briefly. The optical touch panel has several kinds. For example, a relatively well known optical touch panel is such that an optical sensor is provided at an outer frame of a liquid crystal panel configuring the liquid crystal display, and this optical sensor is used to detect position and moving direction of the operator 12 that gets in touch with the liquid crystal panel. As distinct from this touch panel, the In-Cell type optical touch panel is equipped with an optical sensor array on the liquid crystal panel, which is used to detect the moving direction and position of the operator 12 which gets in touch with or close to the liquid crystal panel.

More specifically, an optical sensor and a lead circuit are formed on a glass substrate of the optical touch panel, light received from the outside is detected by the optical sensor and its strength is read by the lead circuit so that the shade of the operator 12 is recognized. In this way, in the In-Cell type optical touch panel, the shape, touch area of the operator 12 and the like can be recognized based on the shade of the operator 12. This enables an operation by the touch "surface" which is difficult for other optical touch panels. Further, application of the In-Cell type optical touch panel contributes to improvements of recognition accuracy and display quality and improvement in design of the liquid crystal display equipped with the In-Cell type optical touch panel and the like.

Figure 2:
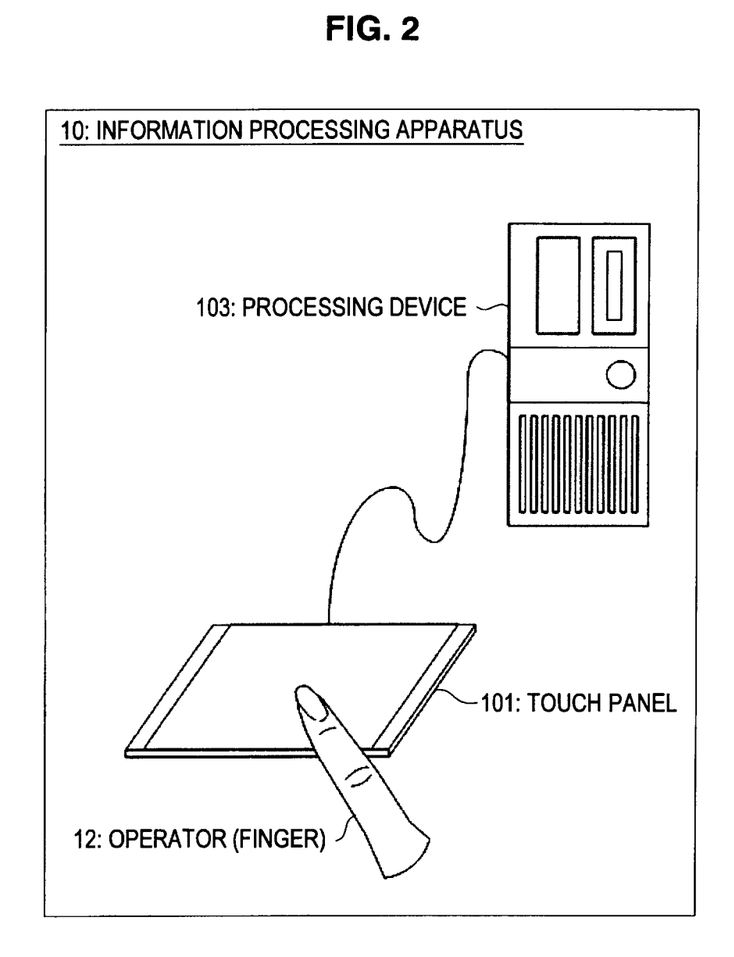
FIG. 2 is an explanatory view for explaining a visual example of the information processing apparatus according to the embodiment.

Here, the configuration of the information processing apparatus 10 equipped with the touch panel 101 may be changed as shown in FIG. 2. In the example of FIG. 2, the touch panel 101 of the information processing apparatus 10 and a processing device 103 for processing position information of the operator 12 and the like detected by the touch panel 101 are provided separately. In this configuration example, data processing required in accordance with processing like moving of the displayed content and the object's selection are executed by the processing device 103. In this way, the information processing apparatus 10 may be freely modified in configuration in accordance with embodiments of the present invention.

Here, the functions of the information processing apparatus 10 are realized by, for example, portable information terminals, portable phones, portable game players, portable music players, broadcasting equipment, personal computers, car navigation systems, information home appliances, or the like.

<Functional Configuration of Information Processing Apparatus>

Figure 3:
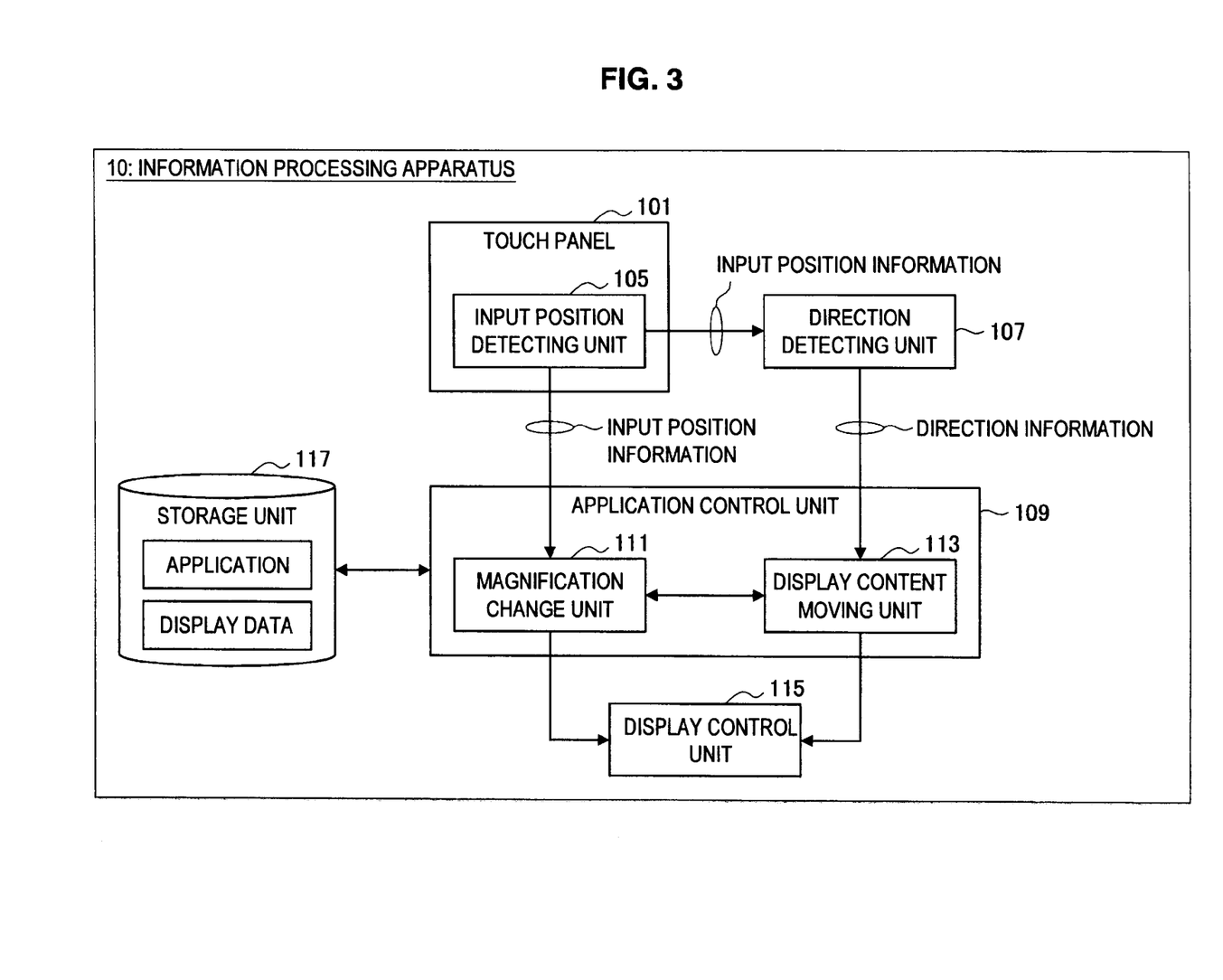
FIG. 3 is a block diagram for explaining functions of the information processing apparatus according to the embodiment.

Next, description is made in detail about the functional configuration of the information processing apparatus according to this embodiment, with reference to FIG. 3. FIG. 3 is a block diagram for explaining the functional configuration of the information processing apparatus 100 according to this embodiment.

As shown in FIG. 3, the information processing apparatus 10 according to this embodiment mainly has, for example, the touch panel 101, a direction detecting unit 107, an application control unit 109, a display control unit 115 and a storage unit 117.

The touch panel 101 is an operation input unit provided in the information processing apparatus 10 according to this embodiment. This touch panel 101 may be above-described optical touch panel or In-Cell type optical touch panel. This touch panel 101 may be formed integral with a display unit (not shown) such as a display device of the information processing apparatus 10 or formed separately as another unit. This touch panel 101 is further provided with an input position detecting unit 105.

The input position detecting unit 105 detects the position of the touch panel 101 touched by the operator 12. The input position detecting unit 105 may be designed to detect pressure on the touch panel 101 by touch of the operator 12. Further, the input position detecting unit 105 may not be touched directly by the operator 12, and may have function to detect existence of the operator 12 which is positioned in a space above the touch panel 101 and close to the touch panel 101 and recognize it as the touch position. That is, the touch position mentioned here may include position information of an operation of the operator 12 drawing in the air space above the screen of the touch panel 101.

Figure 4:
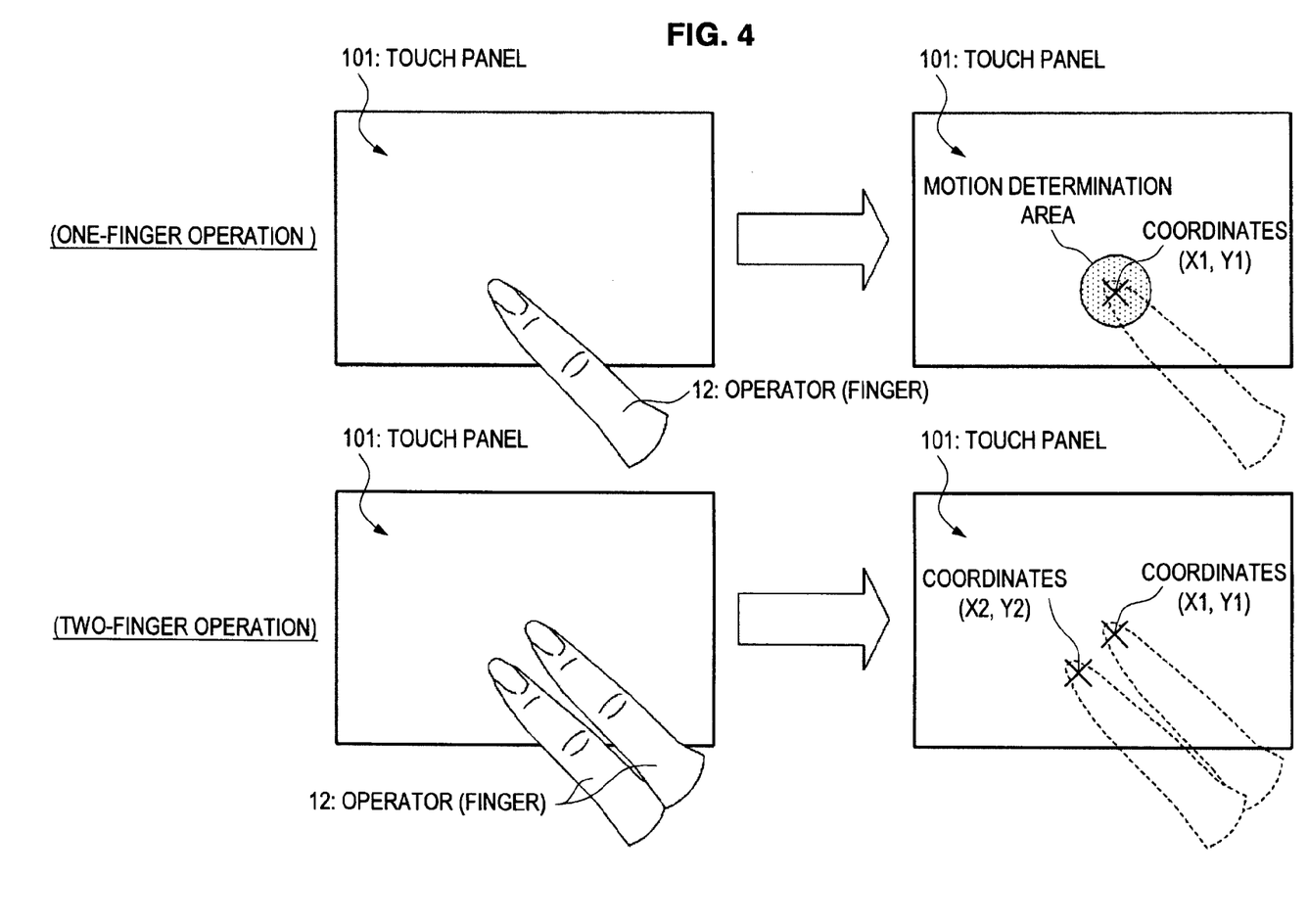
FIG. 4 is an explanatory view for explaining an example of an information processing method according to the embodiment.

The input position detecting unit 105 sends information about the detected touch position (more specifically, the coordinates of the touch position) as input position information to a direction detecting unit 107 and an application control unit 109. For example, as shown in FIG. 4, when the detected touch position includes one position, the input position detecting unit 105 outputs one pair of coordinates (X1, Y1) as input position information. Besides, when the detected touch position includes two positions, the input position detecting unit 105 outputs detected plural pairs of coordinates (X1, Y1), (X2, Y2).

For example, the direction detecting unit 107 may be formed of a CPU (Central Processing Unit), ROM (Read Only Memory), RAM (Random Access Memory) or the like. The direction detecting unit 107 uses coordinate pairs as input position information sent from the input position detecting unit 105 to detect a moving direction of the operator 12.

More specifically, the direction detecting unit 107 detects the moving direction of the operator 12 based on changes in the input position information sent at predetermined time intervals (for example, several milliseconds to several hundred milliseconds). For example, as shown in FIG. 4, the direction detecting unit 107 has set therein a motion determination area used for determination of presence or absence of motion of the operator 12. This motion determination area can be set to any width in accordance with performance of a resolution capable of dividing two touch positions adjacent to each other on the touch panel 101 or the like. For example, the area may be about a radius of 10 pixels. The direction detecting unit 107 determines that the operator 12 has moved when the sent input position information changes beyond the range of this motion determination area. In addition, the sent input position information changes within the range of the motion determination area, the direction detecting unit 107 can determine the operator 12 has performed so called tapping operation. The determination of the operator 12 has moved or not is made about all input position information set at the same timing. That is, when two coordinate pairs are sent as input position information at the same timing, the direction detecting unit 107 performs the above-described determination on changes in time of both of these two coordinate pairs.

Besides, the input position information sent therefrom is changed beyond the range of the motion determination area, the direction detecting unit 107 detects, as the moving direction, the direction of a vector formed by a trail drawn with change in time by the sent input position information. Further, the size of the vector is a moving distance of the operator 12.

Figure 5:
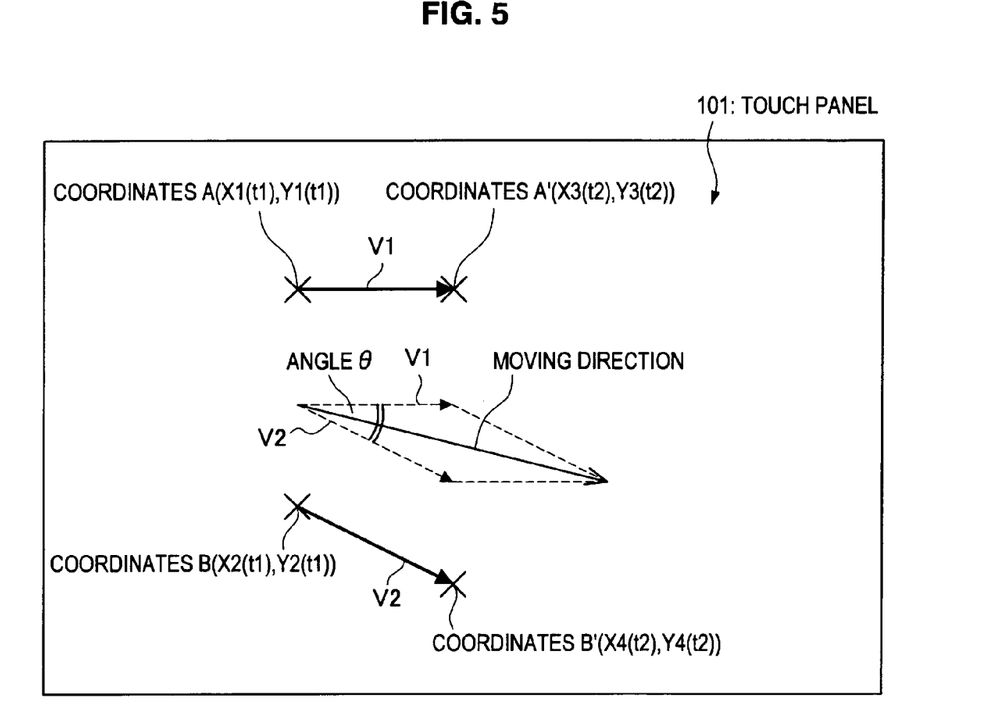
FIG. 5 an explanatory view for explaining an example of the information processing method according to the embodiment.

For example, as shown in FIG. 5, assume that the input position detecting unit 105 sends the coordinate pair A (X1 (t1), Y1(t1)) at the time t1, and the position of this input position information at the time t2 is the coordinate pair A' (X3(t2), Y3(t2)). In this case, the direction detecting unit 107 detects the direction indicated by the vector V1 defined by the start point coordinate pair A and the end point coordinate pair A' as the moving direction of the operator 12 in touch with the coordinates A. In addition, the direction detecting unit 107 sets the size of the vector V1 as a moving distance of the operator 12.

Here, it is assumed that the coordinate pair A (X1(t1), Y1(t1)) and the coordinate pair B (X2(t1), Y2(t1)) are sent from the input position detecting unit 105 at the time t1 as illustrated in FIG. 5. Also in this case, respective vectors V1 and V2 are defined based on coordinate pairs A' and B' at the time t2 corresponding to the input position information. Here, if plural pieces of input position information are sent at the same timing, the direction detecting unit 107 does not determine the moving direction using vectors generated based on the respective input position information pieces, but determines the moving direction by the following method.

For example, as shown in FIG. 5, the direction detecting unit 107 can define, as the moving direction, a direction corresponding to a sum of the two vectors V1 and V2. Besides, not only when two input position coordinate pairs at the same timing, but also when three or more input position coordinate pairs are sent by the same timing, a sum of vectors defined by respective time-varying input position coordinate pairs is obtained, which can be determined as moving direction uniquely. When the moving direction is determined based on plural vectors, the direction detecting unit 107 may define, as moving distance, a length of vector sum or any one vector length.

Further, as shown in FIG. 5, the direction detecting unit 107 can determine the moving direction by focusing attention on an angle θ between the two vectors V1 and V2. In this case, when three or more input position coordinate pairs are sent at the same timing, the direction detecting unit 107 defines a vector that is to be defined by time change of each of the input position coordinate pairs. Then, the direction detecting unit 107 focuses attention on one vector out of the defined vectors and considers an angle between this vector and another vector thereby to determine the moving direction. More specifically, when the angle θ is smaller than a predetermine threshold value and, for example, sharp angle, the vectors are determined as showing the same direction. In addition, when the angle θ is larger than the predetermined threshold value and, for example, obtuse angle, the vectors are determined as showing the directions that go away from each other.

The direction detecting unit 107 sends the application control unit 109 the direction information including the thus detected moving direction and moving distance of the operator 12.

The application control unit 109 has, for example, a CPU, a ROM, a RAM or the like and controls execution of various applications stored in the later-described storage unit 117, ROM and the like. The applications controlled by the application control unit 109 are of changing the magnification, displaying various information pieces on the screen of the display unit (not shown), and scrolling the content displayed on the screen in accordance with a predetermined operation. Such applications may be, as an example, a map application for displaying of the map, web browser, mailer for sending and receiving electronic mails, PDF viewer, electronic book browsing application or the like. The application control unit 109 further includes a magnification change unit 111 and a display content moving unit 113, as illustrated in FIG. 3.

The magnification change unit 111 has, for example, a CPU, ROM, RAM or the like and changes the magnification of a content displayed on the screen by the application control unit 109 based on the input position information sent from the input position detecting unit 105.

Here, the magnification may be a ratio between a size of the content actually displayed on the screen and a reference size of the content, or may be a scale used in map display. When the ratio is used as magnification, the magnification larger than 1 means the displayed content is magnified to be larger than the reference sized content. When the magnification is smaller than 1, the displayed content is reduced to be smaller than the reference sized content. If the scale is used as magnification, as the scale number is smaller, the displayed area becomes narrower, while as the scale number is smaller, a specific area is displayed enlarged.

In more detail, the magnification change unit 111 changes the magnification in accordance with the number of coordinate pairs sent from the input position detecting unit 105. Besides, the magnification change unit 111 decreases the magnification as the number of the sent coordinate pairs increases, while it increases the magnification as the number of coordinate pairs decreases. This magnification change processing is performed continuously, for example.

The relation between the number of sent coordinate pairs and magnification in a running application is defined freely per application. For example, they may be stored in the storage unit 117 described later in the form of database or correspondence table. Besides, the relation between the number of sent coordinate pairs and magnification in the running application is defined in advance in the application.

The magnification change unit 111 changes the size of the screen image displayed on the display unit (not shown) in accordance with the magnification change and requests the display control unit 115 to control the screen image.

The display content moving unit 113 is configured of CPU, ROM, RAM or the like and scrolls the content displayed on the screen based on the direction information sent from the direction detecting unit 107. In more detail, the display content moving unit 113 scrolls the content displayed on the screen in the moving direction of the operator 12 in accordance with the moving direction of the operator 12 sent from the direction detecting unit 107. Besides, the scroll width (scroll amount) is determined in accordance with the moving distance of the operator 12 sent from the direction detecting unit 107. In other words, the display content moving unit 113 determines the number of pixels of scrolling the displayed content based on the predetermined relation in accordance with the moving distance of the operator 12 to move the displayed content at fixed speed. For example, the display content moving unit 113 may define a predetermined linear relation between the moving distance of the operator 12 and the number of pixels of scrolling.

Besides, the display content moving unit 113 may change the scroll width of scrolling the displayed content in accordance with the magnification determined by the magnification change unit 111.

The display content moving unit 113 changes the displayed content on the screen displayed on the display unit (not shown) in accordance with the determined scroll width and requests the display control unit 115 to control the screen.

The display control unit 115 is means for making such a control as to display information on the display unit (not shown) in relation to any information. The display control unit 115 reads out display data stored in a storage unit 117 described later or the like and displays it on the display unit (not shown) based on instructions from the application control unit 109.

Besides, the display control unit 115 performs display control of the screen image displayed on the display unit based on instructions sent from the magnification change unit 111. Further, the display control unit 115 performs scroll control of the screen image displayed on the display unit based on the instructions sent from the display content moving unit 113. Through these controls, the displayed content displayed on the display unit is scaled up or down and scrolled.

The storage unit 117 stores various applications which are to be executed by the application control unit 109 of the information processing apparatus 10 according to this embodiment. The storage unit 117 also stores data relating to information displayed on the display unit by the applications executed and controlled by the application control unit 109. The applications stored in the storage unit 117 are read out to be executed by the application control unit 109. Besides, a running application reads out display data stored in the storage unit 117 to display the data on the screen.

Further, the storage unit 117 stores object data displayed on the touch panel 101. The object data mentioned herein includes any parts that make up graphical user interface such as icons, buttons, thumbnail and the like. Besides, the storage unit 117 stores attribute information as associated with respective object data. The attribute information includes, for example, creation date and time of object data or entity data associated with the object data, its update date and time, creator name and updater name, and type of entity data, size of the entity data, importance level, priority and the like.

Besides these data pieces, the storage unit 117 can store various parameters and in-progress reports that are required to be stored in some processing, various databases, if necessary. This storage unit 117 can be accessed readably and writably by the input position detecting unit 105, the direction detecting unit 107, the application control unit 109, the magnification change unit 111, the display content moving unit 113, the display control unit 115 and the like.

Up to this point, the functions of the information processing apparatus 10 according to this embodiment have been described with an example. Each of the above-described elements may be configured using general-purpose members or circuits or using hardware tailored to specific functions of respective elements. Further, the functions of respective elements may be wholly performed by the CPU or the like. Hence, the information processing apparatus 10 of this embodiment may be structurally modified as appropriate in accordance with the technical level of a time of realizing the embodiment.

<Information Processing Method>

Figure 6:
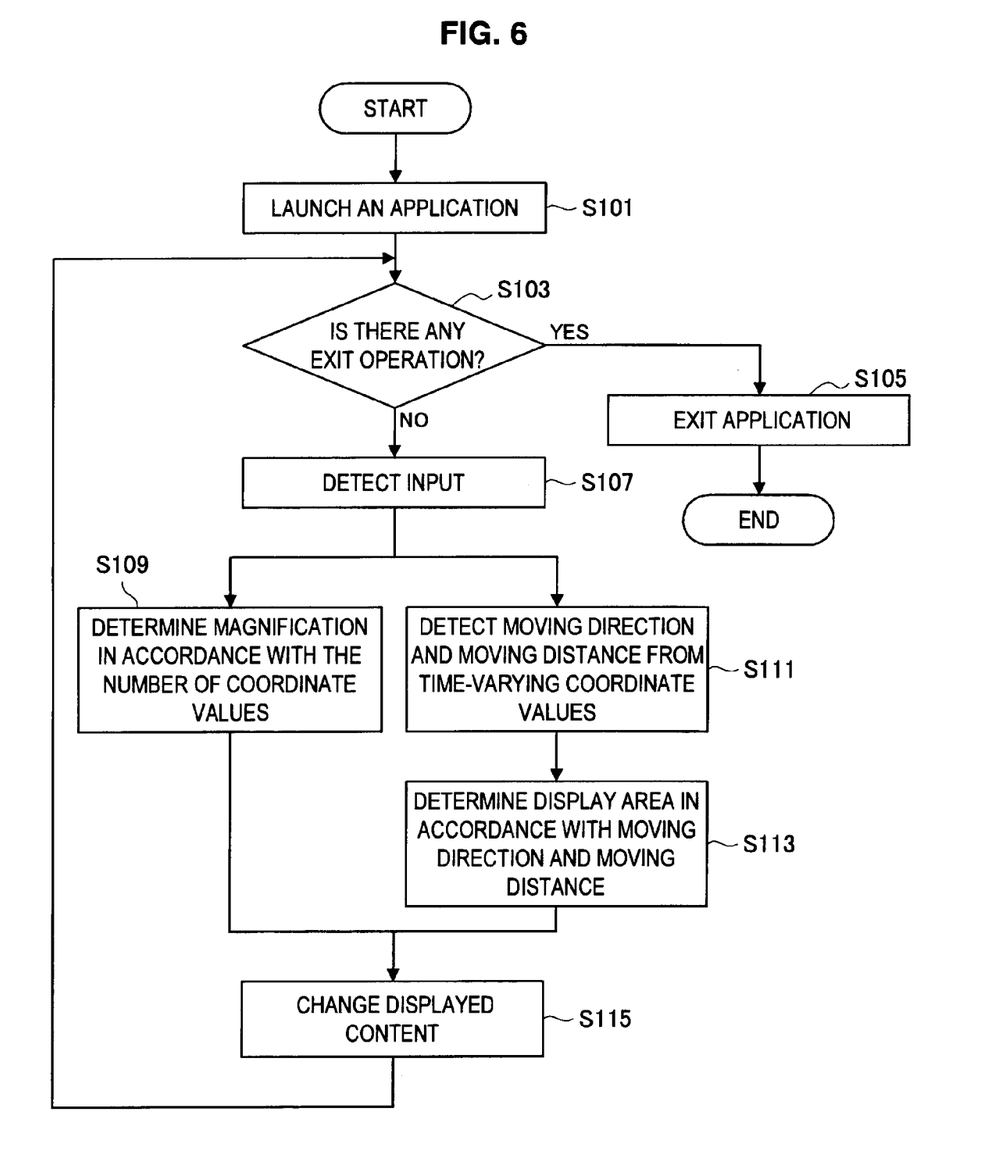
FIG. 6 is a flowchart for explaining the flow of the information processing method according to the embodiment.

Next, description is made in detail about the information processing method according to this embodiment with reference to FIG. 6. FIG. 6 is a flowchart for explaining the information processing method according to this embodiment.

First, the user of the information processing apparatus 10 operates the touch panel 101 with use of the operator 12 such as a finger, stylus or the like to select an object such as an icon associated with an application the user desires to execute. Then, the application control unit 109 of the information processing apparatus 10 launches the application associated with the selected object (step S101).

This is followed by the application control unit 109 receiving an input from the user and determining whether the exit operation of the application is input or not (step S103). When the exit operation of the application is input by the user, the application control unit 109 terminates the running application (step S105).

In addition, when the exit operation of the application is not input, the application control unit 109 still waits for the input from the user.

When the user operates the operator 12 to touch the touch panel 101, the input position control unit 105 detects a position in the touch panel 101 touched by the operator 12 (step S107) and sends the direction detecting unit 107 and the application control unit 109 coordinate pairs corresponding to the touch position as input position information.

Receiving the input position information, the magnification change unit 111 of the application control unit 109 changes a magnification in accordance with the number of the sent coordinate pairs (or number of the operators 12) (step S109). Then, the magnification change unit 111 changes the size of the screen image displayed on the display unit (not shown) in accordance with the changed magnification and requests the display control unit 115 to control the screen image.

Meanwhile, receiving the input position information from the input position detecting unit 105, the direction detecting unit 107 detects a moving direction and a moving distance of the operator 12 based on time variation of the sent input position information (step S111). More specifically, the direction detecting unit 107 takes a direction of a vector of a trail drawn by the sent time-varying coordinate pairs as the moving direction and a size of the vector as the moving distance. When a plurality of coordinate pairs is sent at the same timing, the direction detecting unit 107 takes a direction corresponding to a sum of vectors of respective time-varying coordinate pairs as the moving direction.

The direction detecting unit 107 sends direction information containing the detected moving direction and moving distance to the display content moving unit 113 of the application control unit 109.

Receiving the direction information, the display content moving unit 113 determines a scroll direction of the content displayed on the screen in accordance with the moving direction contained in the direction information (step S113). Besides, the display content moving unit 113 determines a scroll width of the content displayed on the screen in accordance with the moving distance contained in the direction information (step S113). This is followed by the display content moving unit 113 requesting the display control unit 115 to control the screen image so that the screen image displayed on the display unit (not shown) can be scrolled in accordance with the determined scroll direction and scroll width.

Receiving requests about display control of the screen image from the magnification change unit 111 and the display content moving unit 113, the display control unit 115 controls the displayed content displayed on the display unit (not shown) based on the instructions sent from the respective processing units (step S115).

Once change of displayed contents is completed, the information processing apparatus 10 returns to the step S103 again and waits for an input from the user.

Here, in the information processing method according to this embodiment, if there is no change in the number of the operators 12 and movement of the operator 12 is only detected, scroll processing of the displayed content is only performed. In addition, if movement of the operator 12 is not detected and the number of the operators 12 is only changed, the processing of changing the magnification of the screen is only performed in the information processing method according to this embodiment.

As described up to this point, in the information processing method according to this embodiment, the magnification of the screen is changed in accordance with the number of the operators 12 such as finger, stylus or the like used for inputting and changes the scroll direction and scroll width of the displayed content in accordance with the moving direction and moving distance of the operators 12. With this configuration, the information processing method according to this embodiment contributes to realization of seamless and intuitive operations. Further, the information processing method according to this embodiment contributes to provide an operation system capable of easy fine adjustments of the scroll width only with simple operation of adjusting the number of fingers or styluses during operation.

<Application Example to Map Application>

Figure 7:
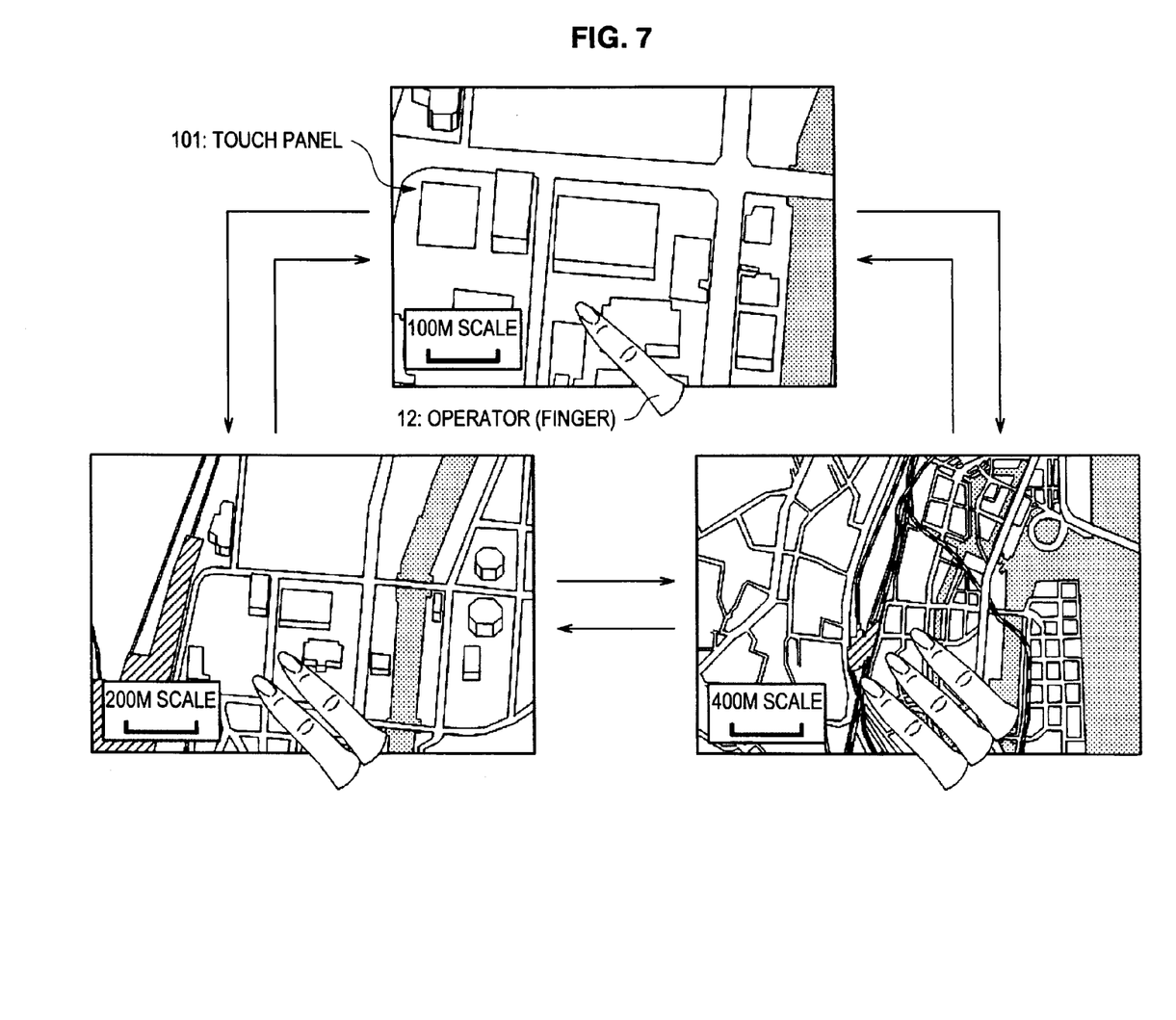
FIG. 7 is an explanatory view for explaining an example of the information processing method according to the embodiment.

Next, with reference to FIG. 7, the information processing method according to this embodiment will be descried briefly by way of an example of the map application. FIG. 7 is an explanatory view for explaining an example of the information processing method according to the present embodiment.

Typically, in the map application, the operation of scrolling to a destination place is performed frequently. Then, the information processing method according to the present embodiment is used to drag the map by the operator such as a finger thereby to change the scale corresponding to the magnification and the scroll width.

For example, in this application example, as shown in FIG. 7, the operation by one operator corresponds to "scroll with scale 100 m", the operation by two operators corresponds to "scroll with scale 200 m" and the operation by three operators corresponds to "scroll with scale 400 m". In FIG. 7, the operation by maximally three operators is illustrated, however, needless to say, the operation by four or more operators may be adopted to set the scale in the like fashion. With this control of the magnification and display content, the magnification change unit 111 and the display content moving unit 113 can change the scroll width and scale in accordance with the number of operators.

In the map application to which the information processing method according to this embodiment is applied, in order to change the scale in accordance with change in the number of operators, the displayed map can be scrolled following the operators. Through this configuration, the user can adjust the scroll width intuitively and seamlessly with use of the operators such as finger only.

For example, in performing the operation of scrolling to any point, the user first uses three operators to scroll the 400 m scale map largely. When the destination is approached, the user takes one operator off and operates with two operators. When the destination is approached more, the user takes one more operator off and operates with one operator finally. Through these operations, as shown in FIG. 7, the scale 400 m map is displayed on the screen by the three-operator operation and the scale 200 m map is displayed on the screen by the two-operator operation. Besides, as shown in FIG. 7, the scale 100 m map is displayed on the screen by the one-operator operation. As the operators are reduced one by one through these operations, the scale of the map can be changed continuously, and therefore the scroll width can be finely adjusted without fine adjustment of dragging amount.

Likewise, in searching for a map indicating a next destination, the one-operator operation is changed to the three-operator operation to enlarge the scale of the map. Through this change, large-width scrolling corresponding to a long distance can be performed without any change in operator's dragging amount.

Switching between the one-operator operation and the two-operator operation, switching between the two-operator operation and the three-operator operation and between the one-operator operation and the three-operator operation may be performed freely. Through this switching, the map displayed on the screen can be switched seamlessly.

In the map application to which the information processing method according to this embodiment is applied, there is an advantage of enabling fine adjustments of scroll width, while maintaining the advantage of intuitive gesture operation on a typical touch panel due to the map that follows the finger. In addition, as the scale is changed in accordance with the number of operators, the screen change can be followed visually and lost of a current position can be prevented. Further, as the same operations, which, however, have different scroll widths, can be allocated to the same gesture, this can prevent user's confusion. Furthermore, as the change size can be increased in accordance with the number of operators and this is the same as the phenomenon that a larger number of fingers can exert a larger force to enable the user to move an object more easily in the physical world, the user can understand the operation intuitively. Hence, user's understanding is promoted and the load of user's learning can be reduced.

<Hardware Configuration>

Figure 8:
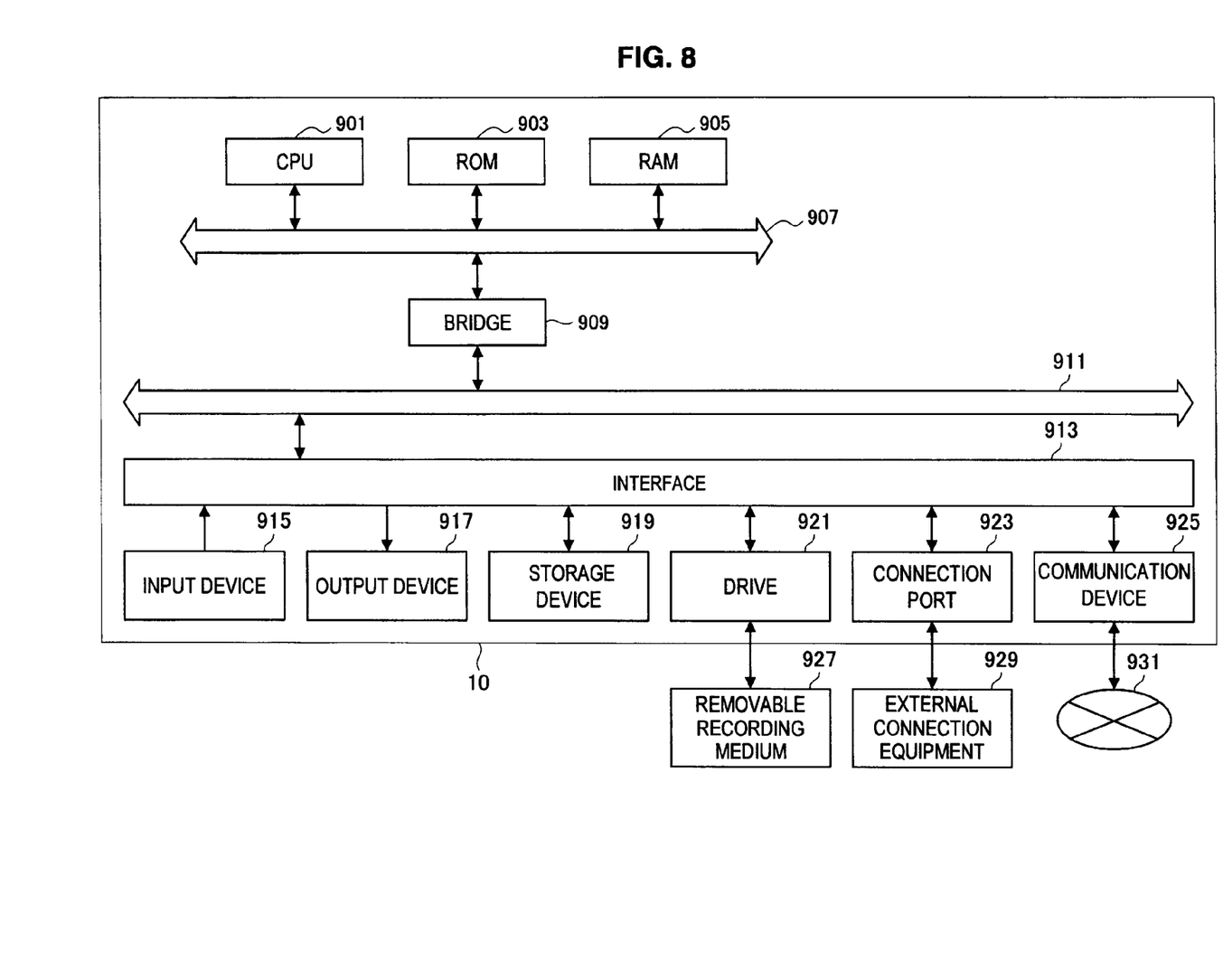
FIG. 8 is an explanatory view for explaining the hardware configuration of the information processing apparatus according to the embodiments of the present invention.

Next, description is made in detail about the hardware configuration of the information processing apparatus 10 according to the embodiments of the present invention with reference to FIG. 8, which is a block diagram for explaining the hardware configuration of the information processing apparatus 10 according to the embodiments of the present invention.

The information processing apparatus 10 mainly has a CPU 901, a ROM 903, a RAM 905, a host bus 907, a bridge 909, an external bus 911, an interface 913, an input device 915, an output device 917, a storage device 919, a drive 921, a connection port 923 and a communication device 925.

The CPU 901 functions as a controller and processor and controls all of or a part of operations in the information processing apparatus 10 in accordance with various programs stored in ROM 903, RAM 905, storage device 919, or the removable recording medium 927. The ROM 903 stores programs, calculation parameters and the like used in the CPU 901. The RAM 905 primarily stores programs used in execution of the CPU 901, parameters changed as appropriate in execution thereof and the like. These are connected to each other by a host but 907 that has an internal bus such as CPU bus.

The host bus 907 is connected to an external bus 911 such as PCI (Peripheral Component Interconnect/interface) bus via the bridge 909.

The input device 915 is operating means operated by a user such as, for example, a mouse, keyboard, touch panel, button, switch, lever or the like. The input device 915 may be, for example, remote controlling means (or remote controller) using infrared ray or other electric wave or an external connection device 929 operable in response to operation of the information processing apparatus 10, such as portable phone, PDA or the like. Further, the input device 915 is configured with an input control circuit for generating an input signal based on information input from the user by way of the above-mentioned operating means and outputting it to the CPU 901, for example. The user of the information processing apparatus 10 can input various data in the information processing apparatus 10 and give processing instructions to the information processing apparatus 10 by operating the input device 915.

The output device 917 is configured to include a device capable of informing the user of received information visually or auditorily, including for example, a display device such as a CRT display, a liquid crystal display, plasma display, EL display and lamp, an audio output device such as speaker, headphone or the like, printer, portable phone, facsimile or the like. The output device 917, for example, outputs results obtained from various processing of the information processing apparatus 10. Specifically, the display device displays the result obtained from various processing of the information processing apparatus 10 in form of text or image. Meanwhile, the audio output device converts audio signals containing reproduced speech data, acoustic data or the like into analogue signals and output the signals.

The storage device 919 is a device for data storage configured as an example of storage unit of the information processing apparatus 10, such as a magnetic storage device like a HDD (hard Disk Drive), a semiconductor storage device, an optical storage device, a magnetic optical storage device or the like. The storage device 919 stores various data and programs executed by the CPU 901, externally input various data and the like.

The drive 921 is a reader/writer for recording media and integrally mounted on or external to the information processing apparatus 10. The drive 921 reads information stored in the removable recording medium 927 inserted such as a magnetic disk, optical disk, magnetic optical disk, semiconductor memory or the like and output it to the RAM 905. The drive 921 is also capable of recoding in the removable recording medium 927 inserted such as a magnetic disk, optical disk, magnetic optical disk, semiconductor memory or the like. The removable recording medium 927 is, for example, DVD media, HD-DVD media, Blu-ray media, compact flash (registered trademark) (Compact Flash: CF), memory stick, SD memory card (Secure Digital memory card) or the like. The removable recording medium 927 may be a non-contact type IC chip-equipped IC card (Integrated Circuit card), electronic equipment or the like.

The connection port 923 is a port for direct connection of the equipment to the information processing apparatus 10, such as USB (Universal Serial Bus) port, IEEE 1394 port such as i.Link, SCSI (Small Computer System Interface) port, RS-232C port, optical audio terminal, HDMI (High-Definition Multimedia Interface) port or the like. When an external connection device 929 is connected to the connection port 923, the information processing apparatus 10 can obtain various data directly from the external connection device 929 and provide various data to the external connection device 929.

The communication device 925 is, for example, a communication interface having a communication device for connection to the communication network 931 or the like. The communication device 925 is, for example, wired or wireless LAN (Local Area Network), Bluetooth, or WUSE (wireless USB) communication card, optical communication router, ADSL (Asymmetric Digital subscriber Line) router or modem for various communications or the like. The communication device 925 is capable of sending and receiving signals or the like under the predetermined protocol such as TCP/IP, in Internet or with other communication devices, for example. Further, the communication network 931 connected to the communication device 925 has a network connected by cables or radio or the like, and may be internet, home LAN, infrared data communication, radio wave communication, satellite communication or the like.

Up to this point, the functions of the information processing apparatus 10 according to the embodiments of the present invention have been described by way of example of implementable hardware configuration. The above-mentioned elements may be configured using general-purpose members or using hardware tailored to specific functions of respective elements. Hence, the hardware configuration used in the embodiments of this invention may be modified as appropriate in accordance with the technical level of a time of realizing the embodiment.

<Conclusion>

As described above, according to the information processing apparatus and information processing method according to the embodiments of the present invention, intuitive operation system can be realized by conforming the operation direction of the operator to the scroll direction of the screen. Besides, as the operation system has consistency, no user may be confused. Further, scroll width can be adjusted seamlessly in accordance with the number of operators, and fine adjustment can be facilitated in the implemented operation system by adjusting the number of operators during operation. Furthermore, change in screen image can be visually tracked by changing the magnifications thereby to prevent lose track of the current position. Thus, according to the information processing apparatus and information processing method according to the embodiments of the present invention, it may be possible to reproduce phenomenon experienced in the physical world and realize the intuitive and interpretive/understanding-promoting operation system.

The present application contains subject matter related to that disclosed in Japanese Priority Patent Application JP 2008-253818 filed in the Japan Patent Office on Sep. 30, 2008, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

Although the above-mentioned embodiments have been described by way of an example of map application, the present invention is applicable likewise to Web browser, mailer for sending/receiving electronic mails, PDF viewer, browsing application of electronic books or the like.

What is claimed is:

1. An information processing apparatus comprising:
an input position detecting unit configured to detect at least one operator positioned on an operation input unit;
a direction detecting unit configured to detect a moving direction of the at least one operator based on time change of respective positions of the detected at least one operator;
a magnification change unit configured to change a magnification of a screen in accordance with a number of operators detected by the input position detecting unit; and
a display content moving unit configured to move a content displayed on the screen along the moving direction of the at least one operator detected by the direction detecting unit, wherein
the magnification change unit changes the magnification of the screen in accordance with a number of operators that are simultaneously detected, and
an amount of magnification of the screen in relation to the number of simultaneously detected operators is defined differently between a first application and a second application.

2. The information processing apparatus according to claim 1, wherein the magnification change unit reduces the magnification as the number of operators increases, and increases the magnification as the number of operators decreases.

3. The information processing apparatus according to claim 2, wherein when a plurality of operators exists, the direction detecting unit selects, as the moving direction, a direction corresponding to a sum of vectors defined by trails drawn by the respective operators.

4. The information processing apparatus according to claim 1, wherein when the respective position of any one of the at least one operator is changed by a predetermined threshold value or more, the direction detecting unit determines that the corresponding operator has moved.

5. The information processing apparatus according to claim 1, wherein the display content moving unit moves the content displayed on the screen at a fixed speed in accordance with a moving distance of the operator, irrespective of the magnification of the screen.

6. The information processing apparatus according to claim 1, wherein the amount of magnification corresponding to each number of the simultaneously detected operators is stored in a database for each one of a plurality of executable applications including the first application and the second application.

7. The information processing apparatus according to claim 6, wherein the first application is a map application and the second application is a web browser application.

8. The information processing apparatus according to claim 1, further comprising:
a storage unit configured to store information for each one of a plurality of executable applications including the first application and the second application on the amount of magnification corresponding to each number of the simultaneously detected operators.

9. The information processing apparatus according to claim 8, wherein the first application is a map application and the second application is a web browser application.

10. The information processing apparatus according to claim 1, wherein the amount of magnification in relation to the number of simultaneously detected operators is predefined for each one of a plurality of executable applications including the first application and the second application.

11. The information processing apparatus according to claim 10, wherein the first application is a map application and the second application is a web browser application.

12. The information processing apparatus according to claim 1, wherein the first application is a map application and the second application is a web browser application.

13. An information processing method comprising the steps of:
detecting at least one operator positioned on an operation input unit;
detecting a moving direction of the at least one operator based on time change of respective positions of the detected at least one operator;
changing a magnification of a screen in accordance with a number of operators detected; and
moving a content displayed on the screen along the moving direction of the detected at least one operator, wherein
the magnification of the screen is changed in accordance with a number of operators that are simultaneously detected, and
an amount of magnification of the screen in relation to the number of simultaneously detected operators is defined differently between a first application and a second application.

14. A non-transitory computer-readable medium having embodied thereon a program, which when executed by a computer causes the computer to execute a method, the method comprising:
detecting at least one operator positioned on an operation input unit;
detecting a moving direction of the at least one operator based on time change of respective positions of the detected at least one operator;
changing a magnification of a screen in accordance with a number of operators detected; and
moving a content displayed on the screen along the moving direction of the detected at least one operator, wherein
the magnification of the screen is changed in accordance with a number of operators that are simultaneously detected, and
an amount of magnification of the screen in relation to the number of simultaneously detected operators is defined differently between a first application and a second application.

* * * * *